July 28, 1959 A. HORN ET AL 2,897,271

COIN RETURN IN TELEPHONE PAY STATIONS

Filed April 25, 1955 3 Sheets-Sheet 1

Inventors.
Arno Horn,
Heinrich Langner &
Max Müller,
By [signature] Atty.

COIN RETURN IN TELEPHONE PAY STATIONS

Filed April 25, 1955 3 Sheets-Sheet 2

Inventors.
Arno Horn,
Heinrich Langner, &
Max Müller.
By [signature] Atty.

Fig. 6 {for Figs. 1 and 5} Fig. 7 {for Figs. 2 and 3} Fig. 8 {for Fig. 4}

Inventors.
Arno Horn,
Heinrich Langner, &
Max Müller.
By. [signature] Atty.

United States Patent Office 2,897,271

Patented July 28, 1959

2,897,271

COIN RETURN IN TELEPHONE PAY STATIONS

Arno Horn, Heinrich Langner, and Max Müller, Munich, Germany, assignors to Siemens & Halske Aktiengesellschaft, Munich, Germany, a corporation of Germany Application April 25, 1955, Serial No. 503,550
In Germany January 28, 1950

Public Law 619, August 23, 1954
Patent expires January 28, 1970

4 Claims. (Cl. 179—6.3)

Figure 1:
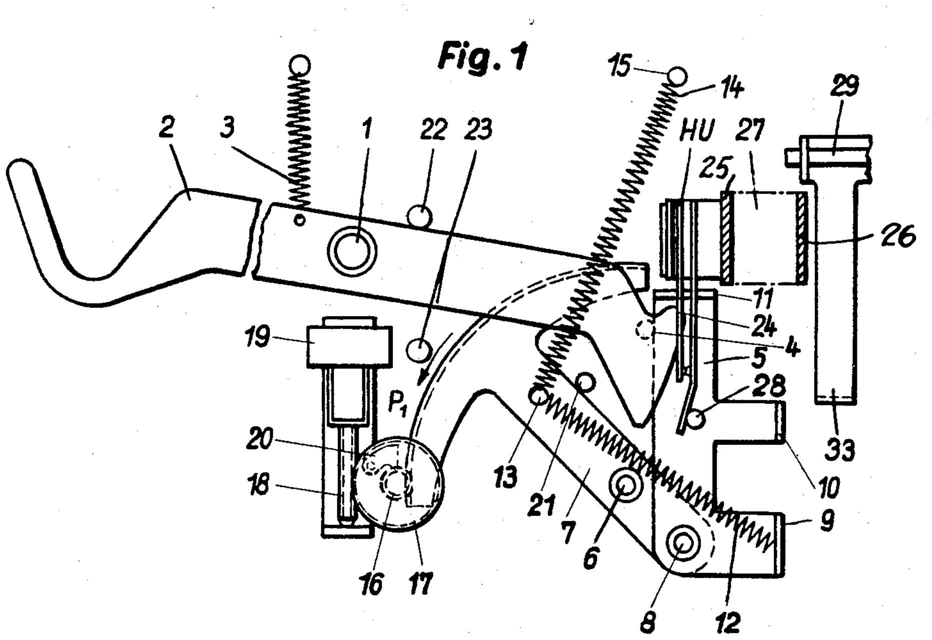

This invention relates to telephone pay stations and is particularly concerned with a delay device for controlling the return of uncollected coins. The delay device according to the invention may be incorporated in a pay station as for example disclosed in copending application Ser. No. 503,551, filed April 25, 1955, but is not limited to use in such a pay station.

Coins deposited in a pay station prior to selection of a desired party must be returned to the patron of the station if the call is not completed. Coins deposited in excess of the amount required for a call must likewise be returned. If the collection of coins is effected, as is usual, at the conclusion of a call, by a collect magnet controlled from the exchange, it is necessary to carry out the return of surplus coins after conclusion of the coin collect operation. The required delay that must be provided between the collection of coins due for a completed call and the return of surplus coins remaining in the coin deposit chute may be effected by magnets controlled from the exchange or by a mechanical delay mechanism the operation of which is set and released by the actuation of the switch hook upon replacement of the receiver.

The invention is concerned with a mechanical delay device employing a brake proved in automatic telephone operation, namely, a speed governor of the type used in telephone dials. The device according to the invention is of simple construction and permits carrying out the operations in accurately predetermined manner wholly unaffected by other operations.

Another advantage of the invention resides in bringing the switch hook contact under the control of the delay mechanism, thereby preventing selection by rapid raising and lowering operations of the switch hook while placing the pay station instantly into operating condition responsive to removal of the receiver after the lapse of the interval normally occurring between two successive calls.

The above indicated advantages and features of the invention are obtained by the provision of a control lever which controls the switch hook contact and the coin return, the lever being coupled only temporarily with the switch hook and describing a motion in accordance with a closed curve determined by guide surfaces and stops, such curved resulting from a pivotal mounting of the control lever upon one end of a lever-like arm which is rotatably journalled intermediate its ends and carries at the other end a toothed segment, the segment cooperating with a speed governor, a spring being provided for coupling the lever-like arm and the control lever. The control lever is upon replacement of the receiver moved by the switch hook and rotates the leverlike arm and therewith the toothed segment against the force of a spring. Shortly before the switch hook reaches its end position, the control lever is uncoupled therefrom and thereupon executes a motion under control of the toothed segment, which is in turn governed by the speed governor, such motion being determined by stops and guide surfaces and being brought about by the angular motion of the toothed segment and by the force of the spring extending between the control lever and the leverlike arm carrying the toothed segment.

Figure 2:
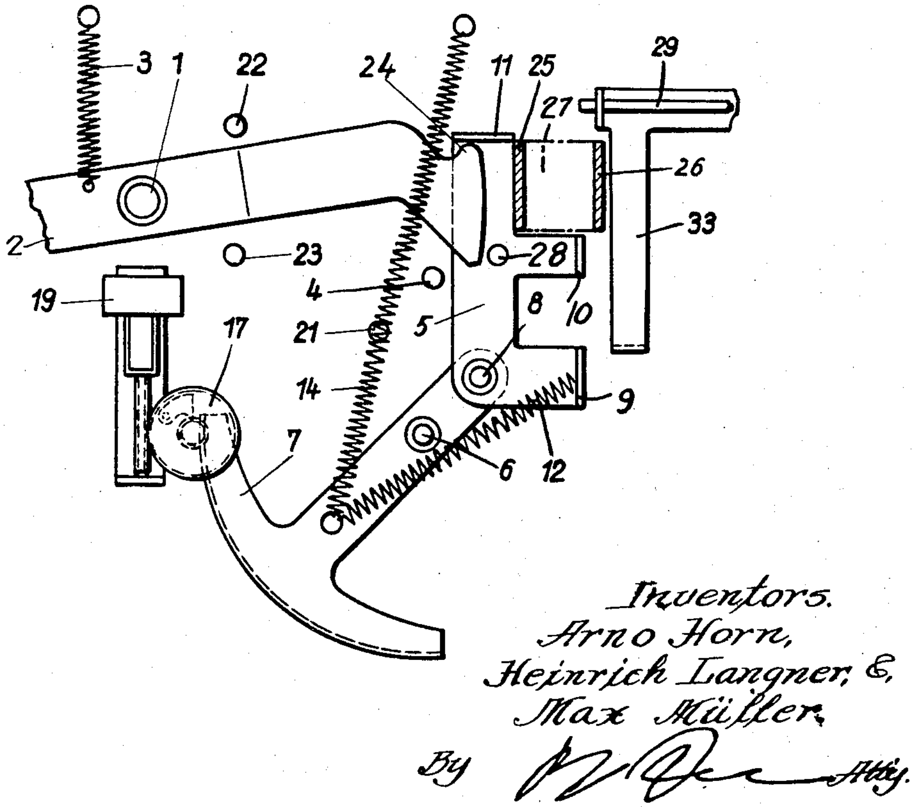
Figure 3:
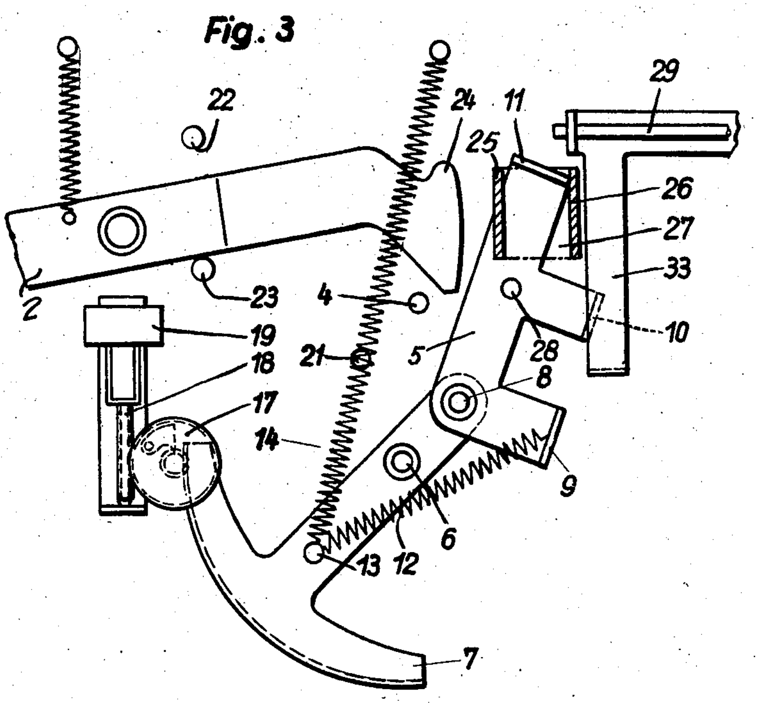
Figure 5:
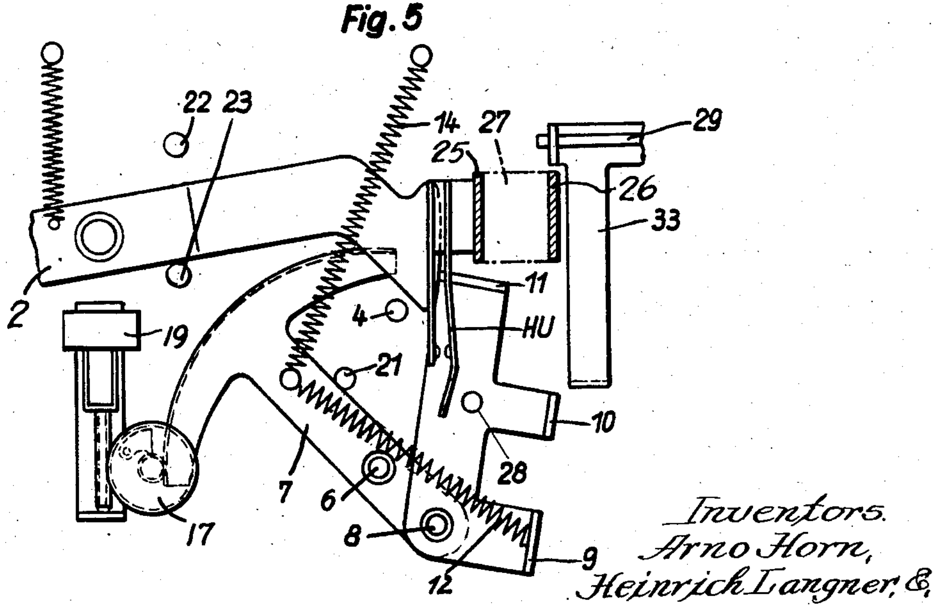
Figure 4:
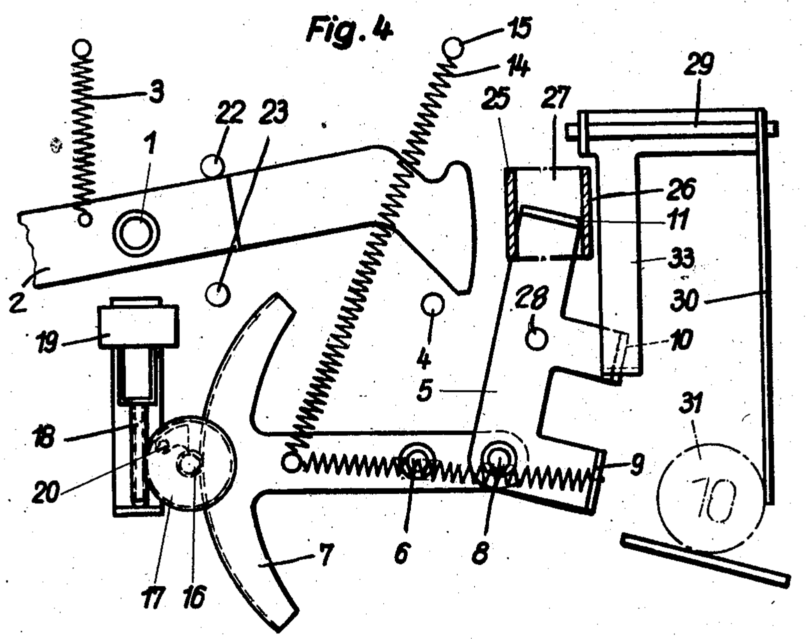
Figure 4:
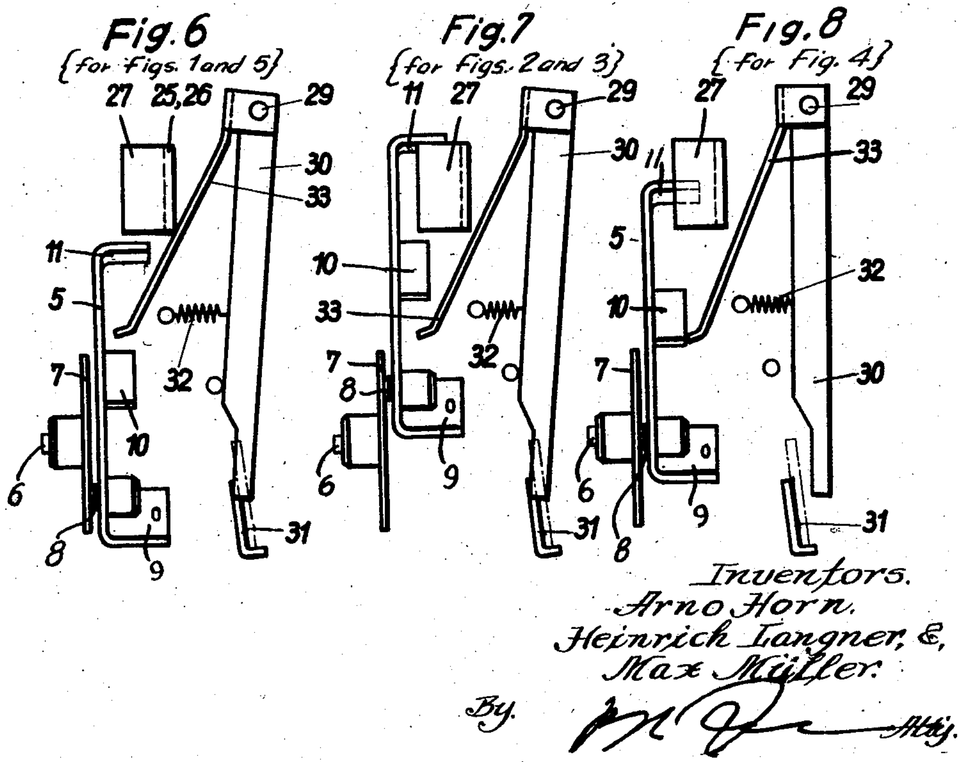

An example of the invention will be presently described with reference to the accompanying diagrammatic drawings illustrating various motion phases of the delay device according to the invention. In these drawings:

Fig. 1 shows the device with the parts in position prior to effecting the coin return;

Fig. 2 indicates the positions of the individual parts after replacement of the receiver shortly before the uncoupling of the control lever from the switch hook;

Fig. 3 illustrates an intermediate position of the control lever;

Fig. 4 indicates the position of the control lever upon initiation of the coin return;

Fig. 5 shows the position of the control lever when the receiver is replaced; and Figs. 6, 7 and 8, underneath Fig. 4, indicate explanatory diagrammatic partial side views applying to parts represented respectively in Figs. 1 and 5, 2 and 3 and 4.

The structural parts belonging to the invention assume the positions shown in Fig. 1 during the time when the pay station is engaged in a call. The switch hook 2 is pivoted about the axis 1 and is held in the illustrated position by the pull of a spring 3. A mounting or frame plate (not shown) carries a stop 4 which is engaged by a control lever 5 made in the form of an inverted F and carrying extensions 9, 10, 11 projecting angularly from its legs as also shown in Figs. 6, 7 and 8. This control lever 5 is pivotally journalled at 8, upon the end of an arm of a toothed segment 7 which is at an intermediate point rotatably journalled about a fixed axis 6. One end of a tension spring 12 engages the extension 9 projecting from the bottom leg of the control lever 5 and the other end of the spring is fastened to pin or post 13 carried by the leverlike arm carrying the toothed segment 7. The post 13 serves at the same time for anchoring one end of a further tension spring 14 which has its other end anchored to a stationary post 15 provided on a suitable structural part of the pay station. The toothed segment 7 is in mesh with a pinion 16 which drives the wheel 17 of the governor 19. The pinion 16 is however not rigidly connected with the wheel 17 but is coupled by the pawl 20 in such a manner that it does not carry along the wheel when the toothed segment is moved in the direction of the arrow $P_1$.

Assuming, however, that the toothed segment 7 rotates in a direction opposite to the direction of the arrow $P_1$, the pawl in engagement with the pinion 16 will carry along the wheel 17, rotating the worm. The angular speed of the wheel 17 depends on the speed governor 19 which is driven thereby over the spindle 18 geared therewith, and the rotation of the toothed segment 7 is thus brought under the control of the speed governor. The toothed segment 7 rotates clockwise, opposite to the direction of the arrow $P_1$, limited by a stationary stop 21. The displacement of the switch hook 2 is limited by the fixed stops 22 and 23.

Upon replacement of the receiver, the switch hook 2 will move counterclockwise; the spring 3 will accordingly be tensioned and the ear 24 at the inner end of the switch hook 2 will lift the control lever 5 into the position shown in Fig. 2. During this this lifting motion, the control lever 5 is guided by sliding engagement of the extension 11 with a fixed surface formed by the wall 25 on a bracket member 27. The upward motion of the control lever 5 causes at the same time rotation of the toothed segment 7 counterclockwise into the position shown in Fig. 2. The spring 14 is thereby extended or tensioned and the spring 12 assumes another position relative to the journal 8 of the control lever 5, namely, a position underneath the journal 8, as shown in Fig. 2.

In the position of the parts as shown in Fig. 1, the spring 12 attempts to rotate the control lever 5 counterclockwise to the left while in the position in which it is in Fig. 2, it attempts to swing the control lever 5 clockwise to the right. The control lever is prevented from executing the corresponding motion so long as the extension 11 is in engagement with the guide surface formed by the wall 25 of bracket member 27.

Accordingly, when the extension 11 leaves the wall 25 shortly before the switch hook 2 has reached its end position, the control lever 5 will uncouple from the switch hook and will move into the position in which it is shown in Fig. 3. The extension 11 now engages the guide surface formed by the wall 26 of member 27 and moves along such surface downwardly, driven by the toothed segment 7 as the segment rotates clockwise back to its initial position by the pull of the spring 14.

The walls 25 and 26 forming the guide surfaces for the ear 11 of the control lever are formed by the legs of the U-shaped member 27 which is in suitable manner fastened on a stationary part and also forms a holding means for the switch hook contact spring set HU (Figs. 1 and 5). This contact set is actuated by a pin 28 carried by the control lever 5. Displacement of the control lever 5 to the right (Fig. 4) accordingly opens the contact HU which in turn causes operation of exchange equipment (not shown) to transmit a collect impulse for the energization of the collect magnet (not shown) at the paystation.

The interval during which the collection of coins must be carried out, prior to the return of surplus coins in the deposit chute, begins at the instant when the control lever 5 snaps away from the guide surface formed by the wall 25 of the U-shaped bracket 27. The motion of the control lever 5 after it has left the guide surface formed by 25 is affected by the delay mechanism under control of the speed governor 19 and is entirely independent of any manipulation of the switch hook.

As will be apparent from Fig. 4, the control lever 5 assumes with progressing delayed clockwise motion of the toothed segment 7 a position in which the extension 10 engages the member 33 which controls the coin return. It is assumed of course that there is provided a coin chute in which coins have been deposited, one such coin, assumed to be disposed at the inner end of the coin chute being shown in Fig. 4 at 31, a wall of the coin chute being shown in engagement with the coin. Additional coins may precede the coin 31. The coin return is effected by a lever 30 extending from the member 33 and journalled upon the axis 29, the lever 30 blocking the discharge of coins 31 reposing in the coin chute into a suitable return receptacle while such lever 30 is in the position in which it is shown in Figs. 6 and 7. However, as soon as the lever 33, which is fixedly connected with the lever 30, is tilted about the axis 29 by the extension 10 of the lever 5, the coin return path will be freed as shown in Fig. 8, and coins like the one shown at 31 (see Figs. 4, 6 and 7) will move along the indicated inclined surface into the coin return receptacle (not shown) from which they can be removed by the patron of the pay station. The angular part on which the coins 31 are shown to rest in Figs. 6, 7 and 8 is part of the coin chute.

The restoring spring 32 shown in Figs. 6 to 8 pulls lever 30 again into its blocking position relative to the coin deposit chute as soon as the extension 10 disengages the lever 33. This condition is obtained when the extension 11 of the lever 5 leaves the guide channel formed by the legs 25 and 26 of the bracket member 27 whereupon the control lever 5 is rotated counterclockwise to the left by the pull of the spring 12 into the position in which it is shown in Fig. 5.

With the receiver replaced on the switch hook, the extension 11 of the control lever 5 will engage the inner end of the switch hook (Fig. 5) so that the contact HU remains open. Upon removal of the receiver, the switch hook will assume the position in which it is shown in Fig. 1, effecting instant closure of the contact HU by the control lever 5.

Changes may be made within the scope and spirit of the appended claims.

We claim:

1. In a telephone pay station having a switch hook for supporting a receiver and having circuit-control contact means to be actuated upon displacement of said switch hook responsive to removal of the receiver incident to initiation of a call, and having a coin chute for receiving coins; a device for governing the actuation of said contact means and for holding coins against discharge into a suitable coin return receptacle and for releasing uncollected coins at the termination of a predetermined delay interval following the replacement of the receiver and consequent displacement of the switch hook into normal position thereof at the completion of a call extended from said station, said device comprising a pivotally mounted blocking member for holding said coils against discharge from said coin chute, a leverlike arm rotatably journalled at a fixed point intermediate its opposite ends, said arm carrying at one end thereof a toothed arcuate segmentlike member geared with a speed governor and carrying at the other end thereof a control lever rotatably journalled thereon, a fixedly disposed guide bracket, actuating means extending from said switch hook for lifting said control lever incident to displacement of said switch hook responsive to replacement of said receiver, part of said control lever sliding during such lifting thereof along part of said guide bracket, said control lever during the lifting thereof rotating said leverlike arm and therewith said toothed segmentlike member into operating position against the force of a first spring means attempting to keep it in normal position, second spring means for angularly tilting and control lever in its lifted position to disengage said control lever from said actuating means extending from said switch hook, said first spring means exerting a force on said leverlike arm to rotate it and therewith said toothed segmentlike member back to normal position, said speed governor geared with said segmentlike member being effective to slow down the rotation thereof to normal position, said leverlike arm moving said control lever which is pivotally journalled thereto correspondingly from its lifted position back to its normal position entirely out of engagement with said actuating means extending from said switch hook with part of said control lever sliding in engagement with said guide bracket, means operated by said control lever at a point during its motion back to normal for actuating said blocking member to permit discharge of said uncollected coins, said second spring means exerting a force on said control lever for tilting it in a direction corresponding to its normal position, and means carried by said control lever for governing the actuation of said contact means.

2. A structure and cooperation of parts according to claim 1, comprising a cross-sectionally U-shaped guide bracket, said control lever carrying an extension for sliding engagement with the outside surface of a wall of said bracket during the lifting motion thereof, said extension sliding between the walls of said guide bracket during the return-to-normal motion of said control lever.

3. A structure and cooperation of parts according to claim 1, comprising a cross-sectionally U-shaped guide bracket, said control lever carrying an extension for sliding engagement with the outside surface of a wall of said bracket during the lifting motion thereof, said extension sliding between the walls of said guide bracket during the return-to-normal motion of said control lever, and a second extension carried by said control lever constituting said means for actuating said blocking member.

4. A structure and cooperation of parts according to claim 1, comprising means for anchoring one end of said second spring means for angularly tilting said control lever with respect to said leverlike arm carrying said segmentlike member.

References Cited in the file of this patent

UNITED STATES PATENTS

| | | |
|---|---|---|
| 1,730,422 | Hall | Oct. 8, 1929 |
| 2,168,864 | Dohle et al. | Aug. 8, 1939 |
| 2,205,491 | Puckette et al. | June 25, 1940 |
| 2,278,536 | Dohle et al. | Apr. 7, 1942 |